US011213863B2

(12) United States Patent
Bischoff et al.

(10) Patent No.: US 11,213,863 B2
(45) Date of Patent: Jan. 4, 2022

(54) FILLING MACHINE AND METHOD FOR FILLING PACKAGES WITH A FLUID PRODUCT

(71) Applicant: SIG Technology AG, Neuhausen am Rheinfall (CH)

(72) Inventors: Jörg Bischoff, Linnich (DE); Barbara Brunk, Neetze (DE); Hanno Geissler, Krefeld (DE); Dirk Hansen, Linnich (DE); Frank Ott, Neuss (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 190 days.

(21) Appl. No.: 16/480,843

(22) PCT Filed: Feb. 2, 2018

(86) PCT No.: PCT/EP2018/052612
§ 371 (c)(1),
(2) Date: Jul. 25, 2019

(87) PCT Pub. No.: WO2018/149660
PCT Pub. Date: Aug. 23, 2018

(65) Prior Publication Data
US 2021/0130021 A1    May 6, 2021

(30) Foreign Application Priority Data
Feb. 15, 2017    (DE) .................... 10 2017 103 040.9

(51) Int. Cl.
*B08B 3/02* (2006.01)
*B08B 9/00* (2006.01)
*B65B 39/00* (2006.01)
*B65B 43/54* (2006.01)
*B65B 55/10* (2006.01)
*B65B 63/08* (2006.01)

(52) U.S. Cl.
CPC ................ *B08B 3/022* (2013.01); *B08B 9/00* (2013.01); *B65B 39/007* (2013.01); *B65B 43/54* (2013.01);
(Continued)

(58) Field of Classification Search
CPC ... B08B 3/022; B08B 9/00; B08B 2203/0264; B65B 39/007; B65B 55/10; B65B 63/08;
(Continued)

(56) References Cited
U.S. PATENT DOCUMENTS 4,960,200 A    10/1990  Pierce
6,035,872 A *  3/2000  Hees ...................... B67C 3/001
                                                   134/167 R
(Continued)

FOREIGN PATENT DOCUMENTS

CN       2484264 Y     4/2002
CN     101772456 A     7/2010
(Continued)

*Primary Examiner* — Nicolas A Arnett
(74) *Attorney, Agent, or Firm* — The Webb Law Firm

(57) ABSTRACT

The invention relates to a filling machine (1, 1') for filling packages (2) with fluid products with a continuously circulating transport device (14) for transporting the packages (2) through the filling machine (1, 1'), comprising a plurality of cells (15) for receiving the packages (2), wherein a supply device (13) for supplying packages (2) to be filled is assigned to a supply region (16) of the transport device (14), and an output device (27) for outputting the packages (2) is assigned to an output region (28) of the transport device (14), wherein a filling region (17) is provided between the supply region (16) and the output region (28) in the transport direction (14) of the transport device (14), and a return region (29) of the respective transport device (14) is provided between the output region (28) and the supply region (16), and wherein at least one nozzle (38, 38') for spraying the cells (15) with a cleaning fluid (40) is associated with the
(Continued)

return region (29) of the transport device (14). According to the invention, so that the accumulation of impurities and the contamination of the filled product with microorganisms can be better prevented, a spray wall (39) is arranged on the side of the transport device (14) facing away from the at least one nozzle (38, 38') and opposite the nozzle (38, 38') in order to catch and discharge cleaning fluid (40) sprayed from the nozzle (38, 38') and passing the cells (15).

15 Claims, 4 Drawing Sheets

(52) U.S. Cl.
CPC .............. *B65B 55/10* (2013.01); *B65B 63/08* (2013.01); *B08B 2203/0264* (2013.01); *B65B 2210/06* (2013.01); *B65B 2210/08* (2013.01)

(58) Field of Classification Search
CPC .. B65B 43/54; B65B 2210/06; B65B 2210/08
See application file for complete search history.

(56) References Cited

U.S. PATENT DOCUMENTS

| | | | |
|---|---|---|---|
| 6,050,391 A | 4/2000 | Terry | |
| 6,575,290 B2 * | 6/2003 | Loning | B08B 9/28 198/494 |
| 7,143,793 B2 * | 12/2006 | Vaughn, Jr. | B08B 3/02 141/89 |
| 8,096,330 B2 * | 1/2012 | Mazzon | B08B 3/02 141/91 |
| 9,475,681 B2 * | 10/2016 | Graff | B67C 3/22 |
| 10,040,677 B2 * | 8/2018 | Clusserath | B67C 3/22 |
| 10,196,252 B2 * | 2/2019 | Hayakawa | B08B 3/02 |
| 10,703,516 B2 * | 7/2020 | Mainz | B65B 65/003 |
| 2008/0083474 A1 * | 4/2008 | Mazzon | B67C 3/001 141/6 |
| 2010/0199605 A1 | 8/2010 | Boldrini | |
| 2012/0018030 A1 * | 1/2012 | Laumer | B67C 3/001 141/1 |
| 2012/0085370 A1 * | 4/2012 | Auer | B65B 55/025 134/23 |
| 2016/0376045 A1 | 12/2016 | Seiche | |
| 2017/0341791 A1 * | 11/2017 | Weiler | A61L 2/208 |
| 2018/0186480 A1 | 7/2018 | Mainz et al. | |

FOREIGN PATENT DOCUMENTS

| | | |
|---|---|---|
| DE | 202008009165 U1 | 1/2009 |
| DE | 102013105034 A1 | 11/2013 |
| DE | 102013107223 A1 | 1/2015 |
| DE | 102013102843 B4 | 3/2016 |
| DE | 102015101751 A1 | 8/2016 |
| WO | 0105658 A1 | 1/2001 |

\* cited by examiner

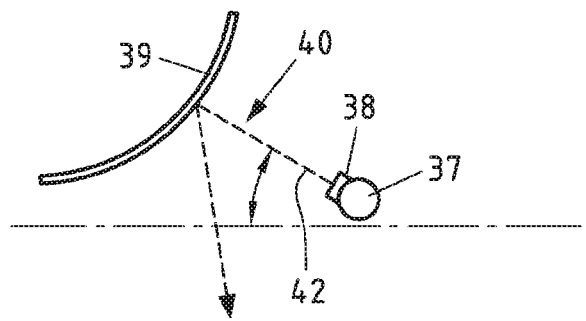
Fig.3
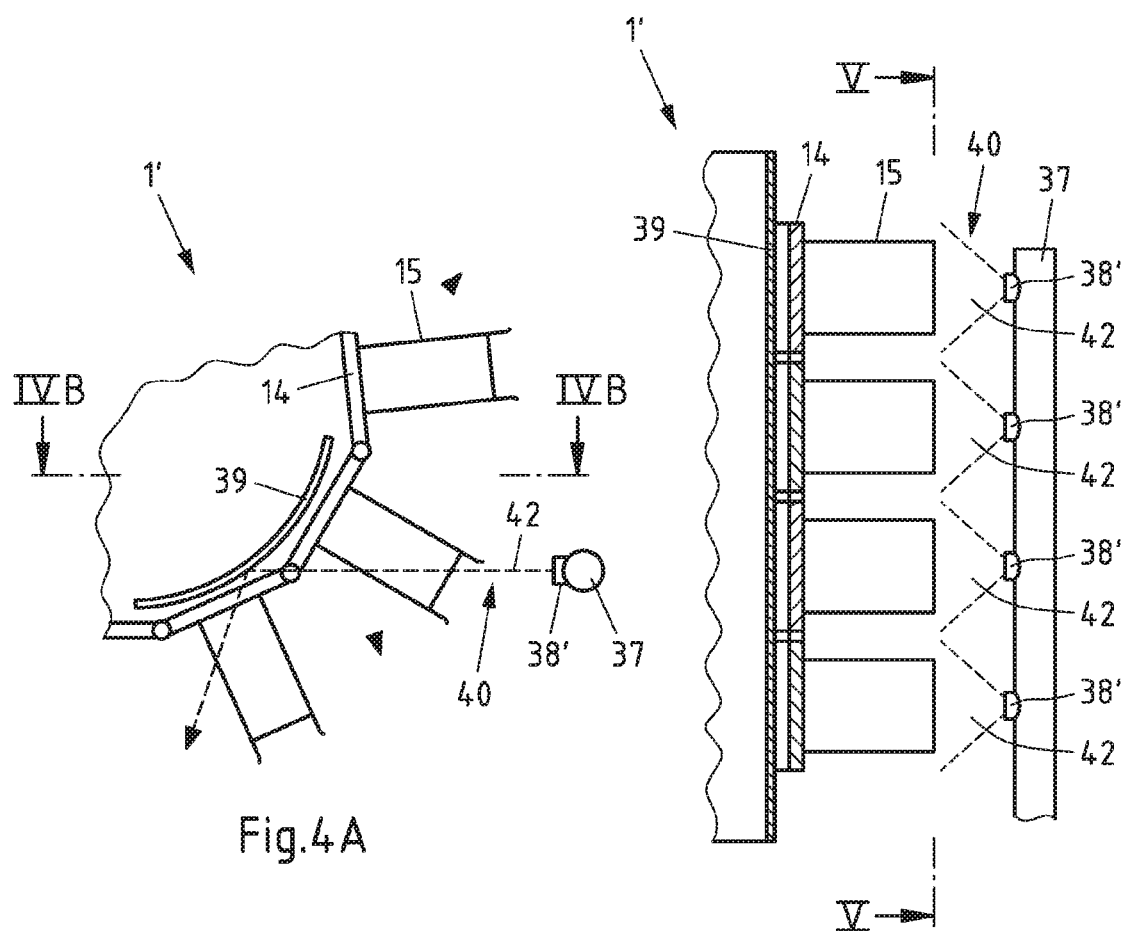
Fig.4A
Fig.4B

FILLING MACHINE AND METHOD FOR FILLING PACKAGES WITH A FLUID PRODUCT

CROSS-REFERENCE TO RELATED APPLICATIONS

This application is the United States national phase of International Application No. PCT/EP2018/052612 filed Feb. 2, 2018, and claims priority to German Patent Application No. 10 2017 103 040.9 filed Feb. 15, 2017, the disclosures of which are hereby incorporated by reference in their entirety.

BACKGROUND OF THE INVENTION

Field of the Invention

The invention relates to a filling machine for filling packages with fluid products, with a continuously circulating transport device for transporting the packages through the filling machine comprising a plurality of cells for receiving the packages, wherein a supply device for supplying packages to be filled is assigned to a supply region of the transport device and a discharge device for discharging the packages is assigned to a discharge region of the transport device, wherein in the transport direction of the transport device a filling region is provided between the supply region and the discharge region and a return region in each case of the transport device is provided between the discharge region and the supply region and wherein at least one nozzle for spraying the cells with a cleaning fluid is assigned to the return region of the transport device. The invention further relates to a method for filling packages with fluid products with such a filling machine.

Description of Related Art

Different filling machines for filling packages open at one side with products, in particular in the form of foodstuffs, are already known. The packages are preferably filled with fluid foodstuffs by corresponding filling machines. As packages, in particular packages which are open on the upper side, are used in order to provide an opening for filling the packages. The packages can for example be cardboard composite packages, which are formed from a packaging material in the form of a laminate comprising a cardboard layer and outer, in particular thermoplastic layers, for example made of polyethylene (PE). The cardboard confers sufficient stability on the packages, so that the packages can be easily handled and for example stacked. The plastic layers protect the cardboard from moisture and allow the packaging material to be sealed to form a closed package. In addition, further layers can be provided, such as an aluminium layer, which prevent a diffusion of oxygen and other gases through the package.

The packages are typically filled with foodstuffs under sterile conditions. In this case, not only does the foodstuff to be filled, but also the package, have to be sterilised. To this end, the foodstuffs are normally heated for a certain period of time. The packages are firstly generally blown out with sterile hot air. A steriliser is then introduced into the packages heated in this manner, which typically is or at least has hydrogen peroxide. Since the package is pre-heated, high reaction speeds are achieved during sterilisation and prevent condensate forming in the package. Moisture and residual hydrogen peroxide are then removed from the package by drying the package with preferably hot and sterile drying air. The filling of the sterile package then takes place with the similarly sterile product which is largely fluid, in particular liquid. Corresponding products are typically foodstuffs such as juices, milk, sauces and the like. After the packages have been filled, they are closed under sterile atmosphere.

During sterilisation and/or filling, the packages can be transported continuously, if necessary at constant speed through the filling machine. However, the packages are more often moved in a clocked manner, i.e. in steps through the filling machine. In this case, the packages can adopt certain positions one after another in each case for a certain period of time in which hot air, steriliser and/or drying air can be applied to the stationary packages by means of at least one nozzle or they can be filled with the product to be filled.

A transport device, which has a row of cells movable in a circulating manner, serves to transport the packages through the filling machine in a targeted manner. In a supply region, the packages are transferred from a supply device one after another into the cells arranged one behind the other. The packages are then moved in the cells through a filling region to a discharge region, while the packages are sterilised, filled and sealed as described. In the discharge region, the packages are then discharged via a corresponding discharge device. The now empty cells are then moved back via a return region to the supply region in order to be able to receive packages to be filled again, in particular that are open at one side. Typically, the filling region and the return region are formed roughly in a straight line, while deviation regions are provided therebetween, in which the transport direction of the cells is reversed. The supply device and the discharge device are in this case typically assigned to the deviation regions for reasons of space.

In order to maintain an uninterrupted operation and to not impair the packages, the transport device including the cells is cooled. For this purpose, the transport device is sprayed in the return region with cooling water by means of nozzles. As a result, dirt adhering to the cells is at least partially removed such that an accumulation of dirt can be avoided during the operation in many cases.

Splashes of highly-viscous products, such as sauces, can, however, form very strongly-adhering soiling of the transport device and the cells, which are not sufficiently effectively removed by the cooling water of the cell cooling. Therefore, corresponding impurities may accumulate and favour the growth of microorganisms. This may lead to the product in the packages being contaminated by the ingress of microorganisms. The packages then have a reduced quality since the filled products spoil faster than desired. Even though contamination of the filled product does not result, the packages may be soiled so significantly on their outer side that the packages have to be cleaned after leaving the filling machine. However, this is complex and cost-effective, especially as the packages have to be dry for the purpose of repackaging. Otherwise, the packages may be damaged during cleaning.

All previous tests sufficiently taking into account the existing problems, for example by the cell cooling being so intensive that the transport device can be cleaned better, have not led to satisfactory results. This is for example down to the low construction space available and/or the fact that during cleaning of the transport device, secondary system parts of the filling machine are soiled and/or that an ingress of microorganisms into the packages still results. This can, for example, be the result of splashes or uncontrolled running fluid during the cleaning of the transport device.

Therefore, the object of the present invention is to design and further develop the filling machine and the method in each case of the type previously mentioned and described in more detail such that the accumulation of impurities and the contamination of filled product by microorganisms can be better prevented.

SUMMARY OF THE INVENTION

This object is achieved in the case of a filling machine in that a splash board for collecting and draining cleaning fluid sprayed by the nozzle and passing the cells is arranged on the side of the transport device facing away from the at least one nozzle and opposite the nozzle.

In addition, the mentioned object is achieved by a method for filling packages with fluid products using a filling machine,
- in the case of which in a supply region packages to be filled are supplied in cells to a continuously circulating transport device,
- in the case of which the supplied packages are transported in the cells of the transport device from the supply region via a filling region to a discharge region and are filled at the same time,
- in the case of which the filled packages are discharged in the discharge region from the cells of the transport device,
- in the case of which the cells are returned from the discharge region to the supply region,
- in the case of which the cells are sprayed in the return region by at least one nozzle with a cleaning fluid and
- in the case of which the cleaning fluid sprayed by the at least one nozzle and passing the cells is collected and drained at least partially by a splash board provided on the side of the transport device facing away from the at least one nozzle and opposite the nozzle.

The invention is based on the cleaning of the transport device with a cleaning fluid which is sprayed via at least one nozzle against the transport device so intensively that the impurities are removed from the transport device. At the same time however, soiling of secondary system parts is avoided through the use of a splash board. Secondary system parts are in particular understood as different system parts to the transport device, which are also not envisaged to come into contact with the removed impurities. Therefore, waste water pipes, collection trays, waste water collection containers and the like are not considered secondary system parts. The splash board thus prevents dirt being removed from the transport device and in doing so soiling other system parts on which impurities are not desirable.

In order to ensure that all regions or at least all relevant regions of the transport device are cleaned by means of the cleaning fluid, the nozzle is preferably set such that at least one part of the cleaning fluid sprayed by the at least one nozzle passes the transport device. This part of the cleaning fluid then impacts at least partially on the splash board, which collects the cleaning fluid in this manner. In addition, the splash board drains the collected cleaning fluid through its arrangement and alignment targeted such that soiling of the secondary system parts is prevented.

In order for the transport device to be cleaned in the desired manner, i.e. freed from dirt, a significant part of the cleaning fluid sprayed by the at least one nozzle impacts at high speed on the transport device. As a result, it is possible to loosen the dirt adhered to the transport device from the transport device and then to remove it. The speed of the sprayed cleaning fluid is, for example, dependent on the nozzle used and the type of dirt. However, it is often the case that a part of the cleaning fluid impacting on the transport device is deflected from the transport device and at least partially in the direction in which the transport device is sprayed by the at least one nozzle, sprayed back away from the transport device. Even this part of the cleaning fluid is collected by the splash board and drained namely without secondary system parts being soiled, which is ensured in turn by the arrangement and alignment of the splash board. In addition, the nozzle is arranged and aligned in relation to the transport device such that the cleaning fluid collected by the transport device can drip without soiling secondary system parts.

In order to achieve this, the at least one nozzle and the at least one splash board are arranged on opposing sides of the transport device and opposite one another. The nozzle is in this case aligned in its jet direction to the splash board by means of which the cleaning fluid can be drained in a targeted manner and avoiding secondary system parts.

The cleaning fluid may in a particularly simple case be water. In order to increase the cleaning effect of the cleaning fluid, the cleaning fluid can alternatively or additionally be heated. In this case, temperatures greater than 30° C., preferably greater than 40° C., in particular greater than 50° C. are particularly effective. In this case, to protect the packages at the same time or alternatively, it may be preferred when the temperature of the cleaning fluid does not exceed a temperature of 60° C., if necessary of 50° C. Irrespective of the temperature and type of cleaning fluid, this can be mixed with so-called wetting agents. Wetting agents are tensides, which should not promote the mixing of two phases, but rather the reduction of the interfacial tension between the transport device and the cleaning fluid. The cleaning fluid can thus flow away better. However, if necessary, the cleaning fluid can also be mixed with cleaning agents, in particular tensides which include the dirt particles thus ultimately forming a dispersion of dirt particles and cleaning fluid.

Good cleaning results are also achieved when the cleaning fluid is present at an overpressure of 1 bar to 10 bar at the at least one nozzle. An overpressure of up to 4 bar, in particular 3 bar is particularly preferred in order to avoid excessive atomizing of the sprayed cleaning fluid. This leads to undesired secondary effects and reduces the cleaning force. To this end, the at least one nozzle for efficient use of the cleaning fluid with simultaneously good cleaning performance is preferably a slotted nozzle which can be aligned for a large cleaning region perpendicular to the transport direction of the transport device.

When cleaning of the transport device is mentioned in the present case, cleaning of the cells of the transport device is in particular meant. It is harmless and optionally also desired for the entire transport device to be cleaned. However, if the transport device is only partially cleaned, it is preferred for the cleaned part of the transport device to comprise at least one part of the cells of the transport device. This is based on the fact that the cells receive the packages and the cells, in the uncleaned state, can easily make the packages dirty.

In addition to the cleaning of the transport device, cooling of the transport device can optionally be provided. This is in particular the case when sufficient cooling of the transport device cannot be ensured by the cleaning of the transport device. For the sake of simplicity, the cooling of the transport device can also take place by spraying with a fluid, in particular water. However, since high speeds of the sprayed cooling fluid are not required, a splash board is also not required.

The packages in the present case are preferably laminate packages formed by package material laminates. In a particularly preferred case, they are cardboard composite packages made of package material laminate comprising at least one cardboard layer, preferably at least one barrier layer, for example consisting of aluminium, polyamide and/or an ethylene vinyl alcohol and outer layers made of a thermoplastic, in particular polyethylene (PE).

The longitudinal edges of a package material cut-out formed by the package material laminate are sealed together to form a so-called package sleeve. One of the open ends of the package sleeve can be folded and sealed to form a package base. The package manufactured in this manner and open at one side can be filled in the filling machine with the desired product through the remaining opening. After filling, the still open end of the package sleeve can also be sealed by folding and sealing to form a package head. Optionally, the package head and the package base can also be interchanged in the present case. The package head is then firstly closed and the package is filled via the package base. The method for filling and the filling machine itself do not change or at least do not significantly change in relation to the subject matter of the present invention.

For ease of understanding and to avoid unnecessary repetitions, the filling machine and the method for filling the packages are described together in the following, without distinguishing in each case in detail between the filling machine and the method. For the person skilled in the art, however, it emerges based on the context which feature is in each case preferred for the filling machines and/or the method.

In the case of a first particularly preferred configuration of the filling machine and the method, the at least one nozzle and the at least one splash board are assigned to a common deviation region of the transport device. This allows not only a space-saving spraying of the cleaning fluid via the at least one nozzle and/or the collection and draining of the cleaning fluid via the at least one splash board. At the same time, a constructively simple arrangement of the at least one nozzle and/or the at least one splash board and a simple draining of the collected cleaning fluid is also possible. In particular, it is possible in a simple manner to spray the transport device obliquely with cleaning fluid and drain the cleaning fluid downwards without the drained cleaning fluid containing impurities coming into contact with the cleaning fluid sprayed by the at least one nozzle in the direction of the transport device. As a result, an undesired distribution of impurities in the filling machine is avoided.

Alternatively or additionally, it is preferred for the at least one nozzle to spray the cleaning fluid at least substantially horizontally against the transport direction. Thus, the cleaning fluid sprayed from the nozzle on the transport device is easily and effectively prevented from colliding with the cleaning fluid dripping from the transport device. To this end, the at least one nozzle can be arranged in a space-saving manner and so as to be less disruptive. It may be even more expedient for the nozzle to spray the cleaning fluid at least partially upwards in the direction of the transport device. On the one hand, this serves better cleaning of the transport device since the surfaces of the cells are reached better by the cleaning fluid and the cleaning fluid can also be sprayed better into the cells. In particular in the cases where the at least one nozzle sprays the cleaning fluid at an angle of between 5° and 35°, in particular of between 5° and 20° to the longitudinal axis of the cells on the cells, good cleaning performances result. The longitudinal axis of the cells is in this case aligned preferably parallel to the direction into which the packages are pushed into the cells and/or out of the cells. In this case, the cleaning fluid can alternatively or additionally be sprayed against the cells in the movement direction of the cells and/or counter to the movement direction of the cells. The surfaces of the cells are thus reached better. When spraying the cleaning fluid into the movement direction of the cells, the surfaces pointing counter to the movement direction are in particular sprayed, while the surfaces pointing in the movement direction are sprayed when spraying the cleaning fluid against the movement direction.

In order to save construction space and to reduce the constructive complexity, it lends itself to form the splash board as a splash guard. This also has the advantage of the splash board being able to optionally be bent easily into the desired shape. In this case, it is essentially particularly expedient to drain the cleaning fluid downwards if at least the part of the splash board facing the nozzle or sprayed by the nozzle with cleaning fluid at least partially, in particular largely points downwards. In this case, the splash board or the corresponding part of the splash board largely points downwards when the surface of the splash board relevant for this purpose or the tangents at this surface forms an angle of less than 45° to the horizontal. In this case, it is not required for the splash board or the corresponding surface of the splash board to be formed flat. The splash board or the corresponding surface of the splash board can preferably be curved and namely in particular convexly. Particularly in the region of the deviation, this saves scarce construction space and enables a subsequent change of the spray direction of the at least one nozzle without the cleaning fluid being deflected or reflected by the splash board too much to the side. For hygiene reasons, the splash board is preferably manufactured from stainless steel.

It lends itself in particular for the simple and reliable draining of cleaning fluid and of dirt particles for a tray to be arranged under the splash board to collect dirty cleaning fluid. Constructively, this solution is easy to implement when the tray is arranged under the transport device. On the one hand, more space is available there. On the other hand, the cleaning fluid drained by the splash board, reflected or deflected in particular by the splash board and/or dripping down from the splash board can wash loose impurities from the transport device and drain them into the tray. The cleaning fluid can thus be used at least twice for cleaning the transport device. In this case, it is particularly expedient when the direction in which the cleaning fluid is sprayed by the at least one nozzle and the direction into which the cleaning fluid collected by the splash board is reflects or deflects or drips, are significantly different. Thus, the first-mentioned direction can for example run at least substantially horizontally and the second-mentioned direction can for example run at least substantially vertically. Thus, the cleaning fluid coming from the nozzle optionally cleans the transport device from the outer side, while the cleaning fluid reflected or deflected or dripping from the splash board cleans the transport device from the inner side of the transport device. It is thus preferred for at least one part of the cleaning fluid directed from the nozzle on the splash board to be reflected by the splash board in a jet shape in order to expediently also clean the cells from their rear side. Alternatively or in addition to the reflected cleaning fluid, the corresponding cleaning can also be performed by cleaning fluid dripping from the splash board.

An effective draining of cleaning fluid from the splash board, on the one hand, and optionally, good cleaning of the transport device from its inner side can for example be achieved when the inclination and/or curvature of the side of the splash board facing the nozzle and the spray direction of the at least one nozzle are matched to one another such that the cleaning fluid is reflected at least substantially in the vertical direction from the splash board. In this direction, system parts are typically not provided, whose soiling would lead to a notable impairment of the operation of the filling machine. However, washing the transport device from above is favoured by the direction of gravity. In this case, it is not absolutely necessary for the cleaning fluid to be reflected precisely in the vertical direction. It may for example be sufficient for the angle to the vertical to be smaller than 10°, in particular smaller than 5°. It is understood that the cleaning fluid is not reflected in the same manner by the splash board as this would be the case with solid, in particular spherical particles. The direction of the reflection of the cleaning fluid is, however, understood in the present case for better comprehension as the direction which is specified by the incident angle of the cleaning fluid sprayed by the nozzle in relation to the splash board and the resulting reflection angle for particles. In the present case, it is thus in this respect done simplify in such a way that the cleaning fluid would be composed of many small particles.

In order to improve the cleaning of the cells of the transport device and the transport device itself, it lends itself for the cells to be open at the base side and/or head side. The latter also simplifies the supply and discharge of the packages prior to and after filling. Cells open at the base side can simplify the discharge of the packages by the packages being ejected from below out of the cells by a package ejector. Irrespective of the supply and discharge of the packages, head side and/or base side openings facilitate the entry and/or exit of the cleaning fluid into or out of the cells. The cleaning fluid sprayed by the at least one nozzle readily enters through the head side opening into the cells and easily back out through the base side opening in order to subsequently be collected by the splash board. The cleaning fluid reflected and/or dripping from the splash board can also re-enter the cells from the rear side of the cells through the base side opening and then flow back out of the cells from the head side opening. The cells can thus be washed or rinsed the outer side inwards and again from the inner side outwards and namely in this sequence which favours the removal of the dirt.

In the case of a base side opening of the cells, it lends itself for a package ejector to be assigned to the inner side of the transport device. In order to save construction space and to allow simple operation, the package ejector can be provided in the deviation region of the transport device. In order to eject the packages from the cells via the base region of the cells, the package ejector can penetrate at least partially into the cells and namely via the base side opening. In this case, it lends itself in particular in relation to the arrangement of the package ejector in the deviation region of the transport device for the part of the package ejector ejecting the packages to be guided in an oscillating manner. The ejection movement of the package ejector can thus be expediently adapted to the movement of the cells in the region of the package ejector.

Alternatively or additionally, the cleaning can optionally be improved by the at least one nozzle spraying cleaning fluid at least partially upwards into the cells. This occurs, for the sake of simplicity, for example from the head side of the cells, wherein it lends itself for the cells to have a head side opening. However, alternatively or additionally, the at least one nozzle and the at least one splash board can be aligned in relation to one another such that the cleaning fluid reflected by the splash board cleans the cells at least partially from above. In this case, the reflection is preferably understood as previously described. The cleaning can be further favoured in this connection when the cells are cleaned from their base side and for example the cleaning fluid enters the cells through a base side opening.

In order to be able to fill many packages in a short time, it lends itself for the transport device to have a plurality, preferably three, four, five or six rows of circulating cells preferably parallel to one another. The packages transported in the parallel rows of cells are sterilised, filled and sealed in the filling machines in parallel and at the same time. In order to also design the cleaning efficiently, provision can be made for at least one nozzle to be assigned to each row of cells. Thus, the spraying of each one of the cells can be optimised or adapted in a targeted manner separately via the at least one associated nozzle. In order to keep the constructive complexity as low as possible, at least one nozzle can also be provided alternatively or additionally which sprays all cells arranged in parallel. As a result, a pre and/or post cleaning can optionally be carried out. Essentially, a separate splash board can also be assigned to each row of cells. As a result however, the danger of undesired soiling of secondary system parts increases. However, it is generally constructively simpler to provide a single splash board for all rows of cells together. In each case, it is preferred for the angular regions of the nozzles to overlap one another partially in the region of the transport device and/or the cells such that all surfaces of the transport device and/or the cells can be cleaned.

A further constructive simplification whilst preserving construction space can be achieved by connecting a plurality of nozzles to a nozzle pipe. In this case, the nozzles can be arranged beside one another for the sake of simplicity and optionally assigned to different rows of cells. It is also particularly simple and space-saving for the at least one nozzle pipe to be aligned at least substantially horizontally.

BRIEF DESCRIPTION OF THE DRAWINGS

The invention is explained in greater detail below by means of a drawing merely depicting exemplary embodiments. The following are shown in the drawings.

DESCRIPTION OF THE INVENTION

Figure 1:
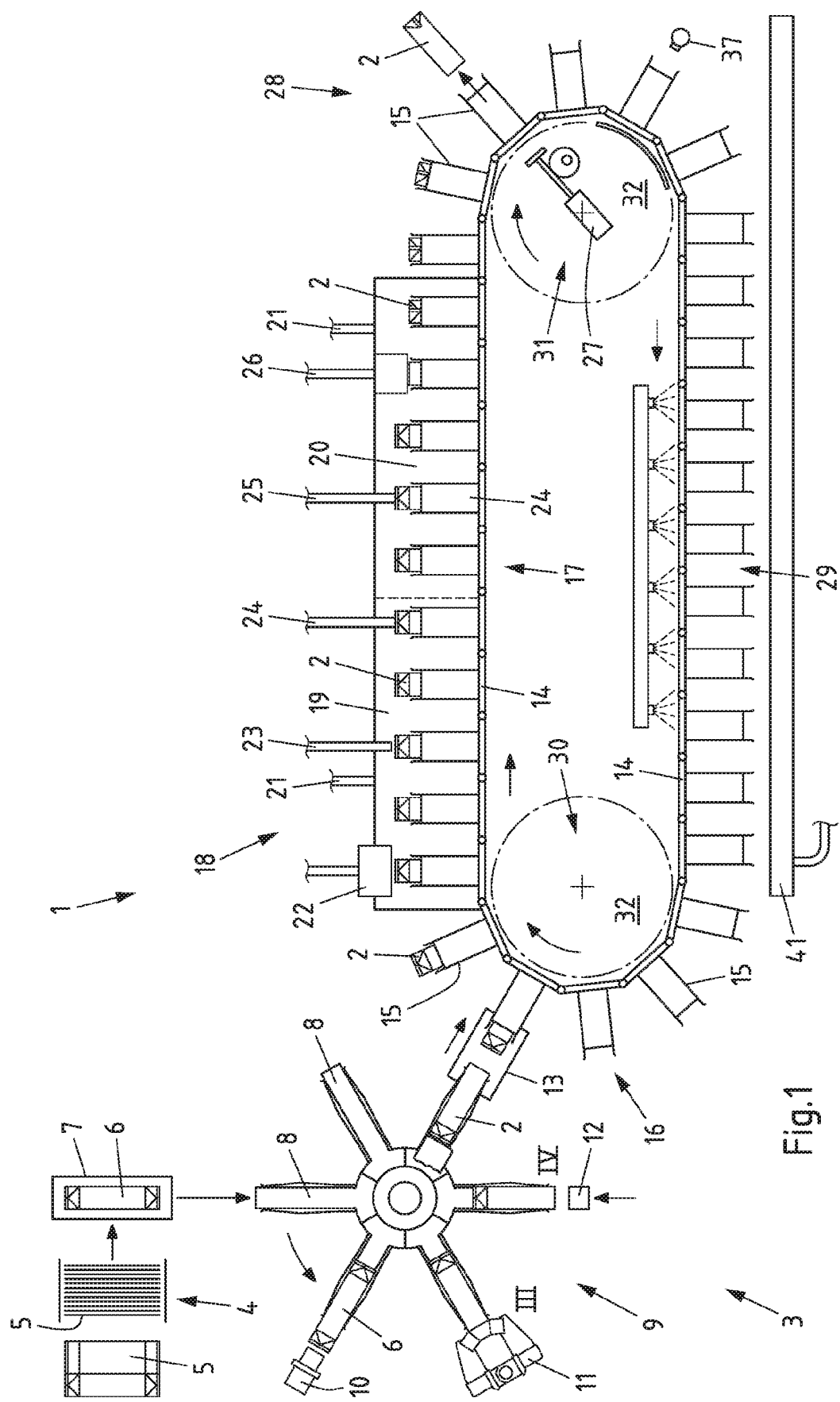
FIG. 1 a first filling machine according to the invention for carrying out the method according to the invention in a schematic side view, FIG. 2 a detail of the filling machine from FIG. 1 in a schematic side view, FIG. 3 a detail of the filling machine from FIG. 1 in a schematic side view with differently aligned nozzles, FIG. 4A-C a detail of a second filling machine according to the invention in a schematic side view and in schematic sectional views along the section planes IVB-IVB and IVC-IVC of FIG. 4A-B and FIG. 5 a nozzle arrangement of a third filling machine according to the invention in a view similar to FIG. 4C.

In FIG. 1, a filling machine 1 for filling packages 2, in particular with fluid foodstuffs is represented, which in this case comprises a moulding device 3 for moulding packages 2 to be filled. Essentially, it is, however, also possible for packages 2 to be filled and open at one side to already be supplied to the filling machine. The filling machine 1 represented and in this respect preferred also has a row of parallel processing lines of which only one processing line is represented in FIG. 1. A bundle 4 of package blanks 5 is assigned to each processing line, whose longitudinal edges are sealed together and thus form package sleeves 6 open on both sides. The package sleeves 6 are folded by a transfer device 7 and pushed onto a mandrel 8 of a mandrel wheel 9.

The mandrel wheel 9 represented and in this respect preferred is rotated cyclically, i.e. gradually. In this case the package sleeves 6 are processed in different positions. Firstly, an edge is heated with hot air using a heating unit 10 and then pre-folded in a pre-fold 11 in order to then seal the pre-folded edge with a press 12 to form a base. A package 2 open at one side and tightly sealed at one end is thus obtained which is transferred by a supply device 13 to a transport device 14 continuously guided in a circle. The supply can take place by simply removing the package 2 from the mandrel 8 and inserting it into a cell 15. In this case, the packages 2 are introduced one after another into separate cells 15, guided in a circle, of the transport device 14, which are located in each case in the supply region 16 of the transport device 14. The filling machine 1 represented and preferred in this respect is, in the case of the transport device 14, a continuously circulating cell chain.

The package 2 is transported by the transport device 14 in a filling region 17 through an aseptic chamber 18 which is subdivided one after another into a sterilisation area 19 and a filling and sealing area 20. The transport of the packages 2 does not have to take place in a straight line, but rather can also take place in at least one bend or even in a circle, depending on whether the filling machine 1 is a so-called inline filling machine or a rotary filling machine. The aseptic chamber 18 is rinsed with sterile air via corresponding sterile air connections 21 in order to prevent the ingress of germs.

Sterile hot air is firstly blown into the packages 2 open at the top by a pre-heating device 22 in order to preheat the packages 2. A steriliser is then blown into the packages in a sterilisation device 23, which reacts strongly and condenses less in the pre-heated packages 2. Hydrogen peroxide can in particular be considered for the steriliser. The hydrogen peroxide can be introduced together with steam and/or air into the package 2 open at one side. After the packages 2 have been sterilised, the interior of the packages 2 is dried in a drying device 24 by applying drying air. The drying air is in this case preferably hot and sterile.

After the transition from the sterilisation area 19 to the filling and sealing area 20, the packages 2 open at one side are positioned under a filling device 25 and filled with a foodstuff. The filled packages 2 are then closed with a closing device 26 by folding the upper open region of the package 2 and sealing the same. The sealed packages 2 are then discharged via a discharge device 27 in a discharge region 28 of the transport device 14 out of the cells 15 of the transport device 14 and then optionally processed further. The now empty cells 15 of the transport device 14 are moved further in the direction of the mandrel wheel 9 via a return region 29 of the transport device 14 and receive further packages 2 there. In order to be able to transport the cells 15 continuously back and forth, deviation regions 30, 31 are assigned to the supply region 16 and the discharge region 28, in which in the case of the filling machine 1 represented and preferred in this respect so-called deviation rollers 32 are provided.

Figure 2:
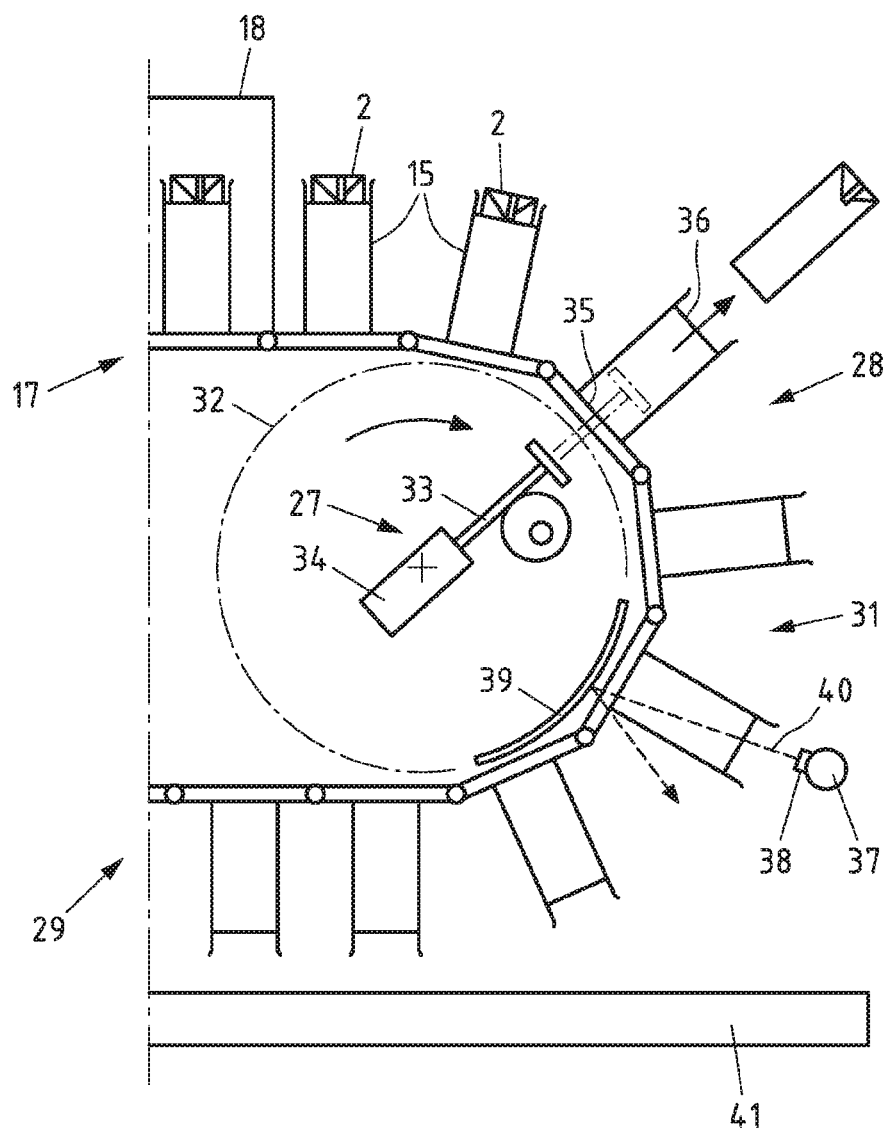

A detail of the filling machine 1 comprising the rear deviation region 31 is represented in FIG. 2. The discharge device 27 formed as the package ejector is assigned to this region, said discharge device 27 having an plunger 33 for ejecting the packages 2 out of the cells 15. The plunger 33 is pushed forwards and backwards by a drive 34, while the plunger 33 is held oscillating on the guide. The plunger can thus be moved with the transport device 14 by a further clock pulse. In order to eject the packages 2, the plunger 33 presses upwards through the base side opening 35 of the cell 15 such that the package 2 is pressed out of the head side opening 36 of the cell 15. The deviation roller 32 is represented only illustrated by the dotted line, said deviation roller deflects the transport device 14 such that the cells 15 are moved via the return region 29 back to the supply region 16 where the cells 15 receive new packages 2.

A nozzle pipe 37 with nozzles 38 and a splash board 39 in the form of a bent splash guard are assigned to the lower part of the deviation region 31. While the splash board 39 is provided on the inner side of the transport device 14, the nozzle pipe 37 and the nozzles 38 are provided on the outer side of the transport device. The transport device 14 is in this case moved past the nozzles 38 together with the cells 15. The nozzles 38 spray cleaning fluid 40 towards the transport device 14 and through the head side openings 36 into the cells 15 in order to loosen and rinse away the impurities adhering to the transport device 14, in particular to the cells 15. The cleaning fluid 40 is sprayed in part past the transport device 14 or back out through the base side opening 35 of the cell 15. This part of the cleaning fluid 40 is collected and drained by the splash board 39. The draining can take place by the cleaning fluid 40 being reflected and/or dripping downwards from the splash board 39. Since the splash board 39 points downwards and in the case of the filling machine 1, represented and preferred in this respect, is convexly curved and namely roughly corresponding to the curvature radius of the transport device 14 in the deviation region 31, the cleaning fluid 40 drained from the splash board 39 enters the tray 41 arranged below the transport device 14. However, a part of the cleaning fluid 40 rinses the transport device 14 beforehand from the top down, wherein a part of the cleaning fluid 40 enters the cells 15 through the base side opening 35 of the cells 15 from the splash board 39 and in doing so rinses out the cells 15 in the direction of the head side openings 36 and then exits the head side opening 36.

In the case of the filling machine 1 represented and preferred in this respect, the nozzle 38 is formed as a slotted nozzle or flat spray nozzle, which generates a flat jet. In addition, the nozzle 38 is aligned such that the longitudinal jet of cleaning fluid 40 is directed slightly upwards and namely roughly at an angle of 10° to the horizontal. If the jet of cleaning fluid 40 impacts on the splash board 39, the cleaning fluid 40 is deflected as a result of the inclination of the splash board 39 downwards in the direction of the tray 41, without the jet of cleaning fluid 40 coming from the nozzle 28 being crossed.

An arrangement of the nozzle 38 of the filling machine 1 is represented in FIG. 3 in another alignment. Optionally, the alignment of the nozzle 38 can be set in order to be able to ensure reliable cleaning of the transport device 14 depending on the application. The angle, at which the nozzle 38 in the alignment of FIG. 3 sprays the cleaning fluid 40 in the direction of the splash board 39, is somewhat steeper than that represented in FIG. 2. The angle is between 20° and 30° to the horizontal. This leads to the cleaning fluid 40 sprayed by the nozzle 38 towards the splash board 39 and bouncing off the splash board 39 being reflected at a different angle from the splash board 39. The cleaning fluid 40 is reflected roughly vertically from the splash board 39. Cleaning fluid 40 also drips off the splash board 39 in roughly the same direction. The splash board 39 can be curved or inclined such that the cleaning water 40 is drained downwards as desired.

Figure 4C:
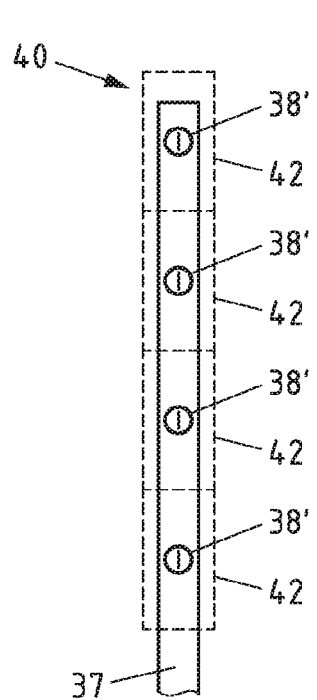

The section of a different filling machine 1' represented for cleaning the transport device 14 is represented in FIGS. 4A-C. The difference with the previously described filling machine 1 is the alignment of the nozzles 38' represented in particular in FIG. 4A. The nozzles 38' are aligned such that the jet 42 of the cleaning fluid 40 impacts roughly horizontally on the transport device 14. A part of the jet 42 of the cleaning fluid 40 is therefore deflected or reflected from the splash board 39 at a different angle, but still downwards. The non-reflected part of the cleaning fluid 40 drips from the splash board 39 or from the transport device 14 downwards. Consequently, at least substantially all the cleaning fluid 40 is collected and drained in the tray 41. The nozzles 38' are represented in FIG. 4B viewed from above. The filling machine 1' has a transport device 14 with four parallel rows of cells 15. A nozzle 38' is assigned to each row of cells 15, wherein the nozzles 38' are arranged such that the transport device 14 is sprayed with cleaning fluid 40 over the entire width. It is particularly effective for the jets 42 of the nozzles 38' to merge into one another, but without notably overlapping one another, as is represented in particular in the horizontal plan view of the nozzle openings in FIG. 4C. Moreover, the jets 42 of the nozzles 38' are aligned such that the jets 42 of the nozzles 38' are in a common plane. The nozzle pipe 37 runs, like this plane, horizontal, wherein the nozzle pipe 37 is able to lie in the plane defined by the jets 42 of the nozzles 38'.

Figure 5:
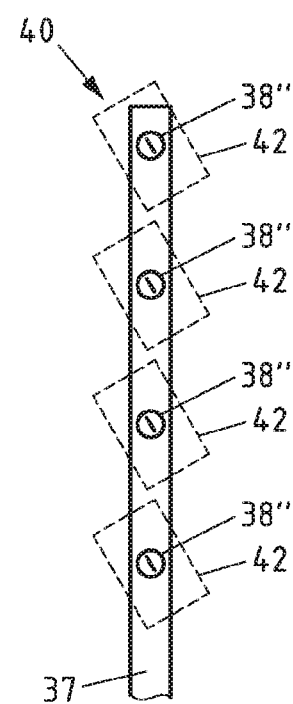

The alignment of the nozzles 38" represented in FIG. 5 points away from the arrangement of the nozzles 38' according to FIG. 4C such that the jets 42 of the nozzles 38" do not define a common plane. The jets 42 are in each case inclined by up to roughly 30° with respect to the horizontal, while the nozzles 38" themselves are arranged in a horizontal line beside one another along the nozzle pipe 37. An inclination of between 5° and 20° to the horizontal can in particular be considered preferable. Thus, all relevant surfaces of the cells 15 are reached by the jet 42 of cleaning fluid 40, for instance the forward and/or rear surfaces of the cells 15. In addition, the jets 42 of the nozzles 38" expand to the side precisely wide enough for the jets 42 not to overlap to the side or directly flat in order to avoid excessive use of cleaning fluid 40.

LIST OF REFERENCE NUMERALS

1 Filling machine
2 Package
3 Moulding device
4 Bundle
5 Package blank
6 Package sleeve
7 Transfer device
8 Mandrel
9 Mandrel wheel
10 Heating unit
11 Pre-fold
12 Press
13 Supply device
14 Transport device
15 Cell
16 Supply region
17 Filling region
18 Aseptic chamber
19 Sterilisation area
20 Filling and sealing area
21 Sterile air connection
22 Preheating device
23 Sterilising device
24 Drying device
25 Filling device
26 Closing device
27 Discharge device
28 Discharge region
29 Return region
30,31 Deviation region
32 Deviation roller
33 Plunger
34 Drive
35 Base side opening
36 Head side opening
37 Nozzle pipe
38 Nozzle
39 Splash board
40 Cleaning fluid
41 Tray
42 Jet

The invention claimed is:

1. A filling machine for filling packages with fluid products, with a continuously circulating transport device for transporting the packages through the filling machine comprising a plurality of cells for receiving the packages, wherein a supply device for supplying packages to be filled is assigned to a supply region of the transport device and a discharge device for discharging the packages is assigned to a discharge region of the transport device, wherein in the transport direction of the transport device a filling region is provided between the supply region and the discharge region and a return region is provided between the discharge region and the supply region in each case of the transport device and wherein at least one nozzle for spraying the cells with a cleaning fluid is assigned to the return region of the transport device, and wherein
   a splash board for collecting and draining cleaning fluid sprayed by the nozzle and passing the cells is arranged on the side of the transport device facing away from the at least one nozzle and opposite the nozzle,
characterized in that
the at least one nozzle and the at least one splash board are assigned to a deviation region of the transport device.

2. The filling machine according to claim 1,
characterised in that
   the at least one nozzle is provided for spraying the cleaning fluid at least partially upwards, and/or
   in that the at least one nozzle for spraying the cleaning fluid is provided at an angle of between 5° and 35° to the longitudinal extension of the cells.

3. The filling machine according to claim 1,
characterised in that
   the splash board is formed at least in sections as a splash guard for collecting and draining cleaning fluid and/or in that the side of the splash board facing the nozzle points at least partially downwards and/or is at least partially convexly curved and/or in that a tray for collecting the cleaning fluid is provided under the splash board.

4. The filling machine according to claim 3,
characterised in that
   the inclination and/or the curvature of the side of the splash board facing the nozzle and the spray direction of the at least one nozzle are matched to one another such that the cleaning fluid is reflected at least substantially vertically.

5. The filling machine according to claim 1, characterised in that
the cells are open at the base side and/or head side.

6. The filling machine according to claim 1, characterised in that
the at least one nozzle is provided such that the cleaning fluid is sprayed at least partially from below into the cells and/or in that the at least one nozzle and the at least one splash board are aligned in relation to one another such that the cleaning fluid reflected by the splash board cleans the cells at least partially from above.

7. The filling machine according to claim 1, characterised in that
the transport device has a plurality of rows of circulating cells and in that at least one nozzle is assigned to each row of cells and/or a common splash board is assigned to all rows of cells.

8. The filling machine according to claim 7, characterised in that
the plurality of nozzles are connected to a nozzle pipe.

9. A method for filling packages with fluid products with the filling machine according to claim 1,
in the case of which in a supply region packages to be filled are supplied in cells of a continuously circulating transport device,
in the case of which the supplied packages are transported in the cells of the transport device from the supply region via a filling region to a discharge region and are filled at the same time,
in the case of which the filled packages are discharged in the discharge region from the cells of the transport device,
in the case of which the cells are returned from the discharge region to the supply region,
in the case of which the cells are sprayed in the return region by at least one nozzle with a cleaning fluid and
in the case of which the cleaning fluid sprayed by the at least one nozzle and passing the cells is collected and drained at least partially by a splash board provided on the side of the transport device facing away from the at least one nozzle and opposite the nozzle, and
in the case of which the at least one nozzle sprays the cells in a deviation region of the transport device and the cleaning fluid sprayed by the nozzle and passing the cells is collected and drained in a deviation region of the transport device by the splash board.

10. The method according to claim 9,
in the case of which the at least one nozzle sprays the cleaning fluid at least partially upwards against the cells and/or
in the case of which the at least one nozzle sprays the cleaning fluid at an angle of between 5° and 35° to the longitudinal extension of the cells against the cells.

11. The method according to claim 9,
in the case of which the cleaning fluid is sprayed by the nozzle at least partially against a splash board formed at least in sections as a splash guard and/or
in the case of which the cleaning fluid is sprayed by the nozzle at least partially against a side of the splash board at least partially pointing downwards and/or at least partially convexly curved and/or
in the case of which the cleaning fluid collected by the splash board is drained to a tray.

12. The method according to claim 9,
in the case of which the cleaning fluid sprayed by the nozzle against the splash board is reflected at least substantially vertically and/or
in the case of which the cleaning fluid enters from the nozzle from below into the head side openings of the cells and from the splash board into the base side openings of the cells.

13. The method according to claim 9,
in the case of which the filled packages are ejected via the base region of the cells out of the cells.

14. The method according to claim 9,
in the case of which the cleaning fluid is sprayed into the cells at least partially from below and/or
in the case of which the cleaning fluid passing the cells is reflected from the splash board at least partially from above against the cells.

15. The method according to claim 9,
in the case of which the transport device lets a plurality of rows of cells circulate and
in the case of which each row of cells and/or a common splash board is sprayed by at least one nozzle.

* * * * *

UNITED STATES PATENT AND TRADEMARK OFFICE
CERTIFICATE OF CORRECTION

PATENT NO. : 11,213,863 B2  
APPLICATION NO. : 16/480843  
DATED : January 4, 2022  
INVENTOR(S) : Jörg Bischoff et al.

Page 1 of 1

It is certified that error appears in the above-identified patent and that said Letters Patent is hereby corrected as shown below:

In the Claims

Column 13, Lines 10-11, Claim 6, after "below" delete "into the cells"

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*